Nov. 19, 1946.         G. E. KING         2,411,162
CONTROL SYSTEM
Filed Dec. 5, 1944
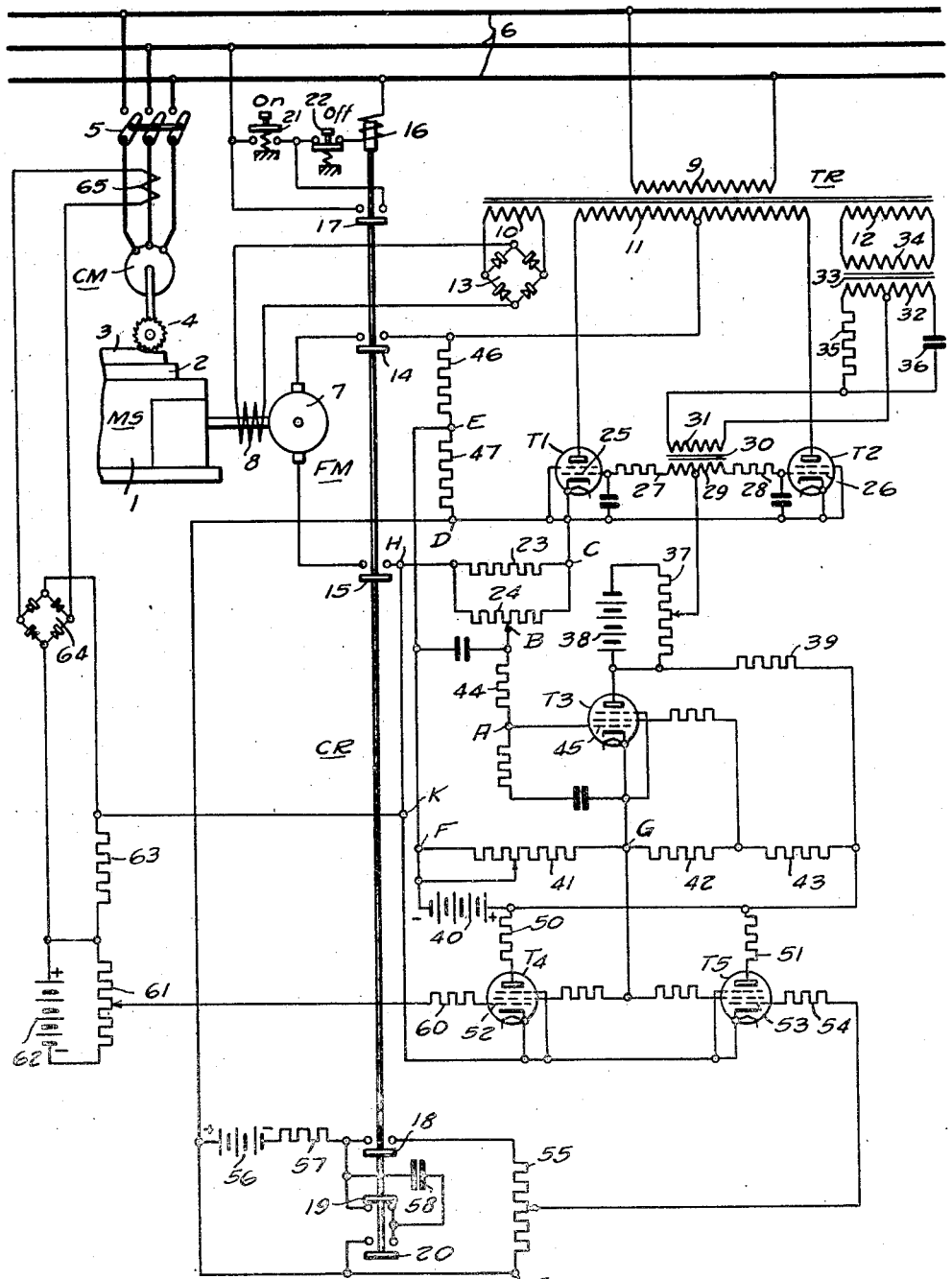
WITNESSES:
INVENTOR
George E. King.
BY
Paul E. Friedemann
ATTORNEY Patented Nov. 19, 1946

2,411,162

UNITED STATES PATENT OFFICE 2,411,162

CONTROL SYSTEM

George E. King, Swissvale, Pa., assignor to Westinghouse Electric Corporation, East Pittsburgh, Pa., a corporation of Pennsylvania Application December 5, 1944, Serial No. 566,723

5 Claims. (Cl. 172—239)

My invention relates to electric motor control systems for grinding machines, milling machines and other machine tools in which a "feed motor" is used to move workpiece and tool relative to each other while the tool performs its cutting or other deforming operation on the workpiece.

For certain applications of such machine tools it is desirable to vary the speed of the feed motor in such a manner as to maintain the load on the tool or cutter below a safe limit in order to prevent damaging the tool. In practice, the feed motor is usually operated at a speed lower than the maximum permitted by the tool, because it is necessary to avoid overloading the tool or cutter at those places along the cut where increased loads occur due to unevenness of surface or irregularities in hardness of the workpiece. Very often, the operator, in order to avoid ruining the tool, will use a slower speed than necessary for a sufficient margin of safety. The customary overload relays installed in the motor control system of the machine tool for protecting the electric equipment are normally set for a fixed maximum load value and neither designed nor accessible to the operator for permitting a change in adjustment to suit particular working conditions. Consequently, such machine tools are apt to be operated below optimum capacity.

It is an object of my invention to provide an electronic system for controlling the drive motors of machine tools in such a manner as to vary the motor speed automatically in dependence upon the load imposed on the tool and with the effect of permitting an operation at or near optimum capacity without the danger of overloading the tool at places of increased cross section or hardness of the material to be worked upon.

Another object of my invention is to provide an electronic control system for machine tools that permits setting the motor speed at a desired normal value and acts automatically to reduce the motor speed below this normal value if and when the load on the tool exceeds a magnitude which can be selected by the operator to suit the workpiece and tool used under particular working conditions.

These and other objects will be apparent from the following description of the control system for a milling machine shown diagrammatically in the drawing as an embodiment of my invention.

The drawing illustrates schematically a milling machine denoted as a whole MS which is provided with a feed motor and a cutter motor denoted as a whole by FM and CM, respectively. The feed motor is energized, under control by an electromagnetic contactor CR, from a power transformer TR through two rectifier tubes T1 and T2 of the gaseous discharge type, for instance, as known under the name Thyratron. These rectifier tubes are controlled by three electronic tubes preferably of the high vacuum type. These tubes are denoted by T3, T4 and T5, respectively.

More in detail, the milling machine MS carries on its stationary supporting or bed structure 1 a horizontally displaceable bed 2 for accommodating a workpiece 3. The milling tool or cutter 4 of the machine is connected by a suitable transmission with the cutter motor CM. This motor is energized through a switch 5 from an alternating current line 6. Motor CM may be operated at constant speed and a control apparatus (not shown) may be provided for adjusting this speed to a desired value.

The displaceable bed 2 of the milling machine is connected by a suitable transmission to the armature 7 of the feed motor FM. The appertaining field winding is denoted by 8.

The power transformer TR has a primary winding 9 connected to the alternating current line 6 and is equipped with three secondary windings 10, 11 and 12. Winding 10 is connected through a rectifier 13 with field winding 8 of motor FM so that this field winding is excited by direct current of constant voltage during the operation of the system. The armature circuit of motor FM extends through two contacts 14 and 15 of contactor CR whose control coil 16 actuates also four additional relay contacts denoted by 17, 18, 19 and 20, respectively. Relay coil 16 is connected to line 6 through a normally open control contact 21 and a normally closed control contact 22. These contacts are preferably designed as pushbutton switches and serve, respectively, to start and stop the operation of motor FM. That is, when contact 21 is depressed by the operator, coil 16 is energized and closes contacts 14 and 15; at the same time contact 17 is closed and completes a self-holding circuit so that coil 16 remains energized after contact 21 is released. The actuation of contact 22 interrupts the self-holding circuit and hence returns relay CR into the illustrated inoperative position.

The secondary winding 11 of transformer TR is center tapped. The center point is connected with contact 14 of relay CR, while the two terminals of winding 11 are attached to the anodes of rectifier tubes T1 and T2, respectively. The cathodes of tubes T1 and T2 are interconnected and attached to contact 15 of relay CR through a series resistor 23. Hence when contactor CR is energized and closes its contacts 14 and 15, the armature 7 of feed motor FM is energized by rectified current derived from the secondary 11 of transformer TR through the plate circuits of tubes T1 and T2. The energizing direct current traverses the series resistor 23 and develops across this resistor a voltage drop which is a measure of the current intensity. A calibrating rheostat 24 is connected in parallel to resistor 23 in order to permit measuring an adjustable proportion of the total voltage drop of resistor 23.

The control grids of rectifier tubes T1 and T2 are denoted by 25 and 26, respectively. These grids are interconnected through two resistors 27 and 28 and the center-tapped secondary 29 of a transformer 30. The primary winding 31 of transformer 30 is connected to the secondary 32 of a phase shift transformer 33 whose primary 34 is supplied with constant excitation from the secondary 12 of the power transformer TR. The connection includes a resistor 35 and a capacitor 36 and functions to impose a component alternating-current voltage on the grid circuit of the rectifier tubes T1 and T2 under maintenance of a given phase displacement between the cycle of this voltage component and that of the alternating-current voltage to be rectified by the tubes T1 and T2.

The grid circuit of the rectifier tubes are further impressed by a variable direct-current voltage component. To this end, the tap point of the transformer secondary 29 is connected to the slider of a rheostat 37 which extends across a voltage source 38 in order to provide an adjustable constant grid bias. Rheostat 37 is also connected with the plate circuit of tube T3. This circuit contains a resistor 39 and is energized from a source of constant voltage, denoted by 40, which is connected across a series arrangement of resistors 41, 42 and 43. Resistor 41 consists of an adjustable rheostat and serves to select a desired speed for motor FM as will be explained in a later place. A calibrating resistor 44 is connected in the circuit of the control grid 45 of tube T3. Connected across the plate circuits of the rectifier tubes T1 and T2 are two resistors 46 and 47, arranged in series relation to each other. When the motor is in operation, the voltage drop across resistors 46 and 47 is proportional to the rectified or terminal voltage applied to the feed motor. Consequently, the proportion of voltage drop appearing across resistor 47 presents a measure of the motor voltage.

The just-mentioned circuit connections of tube T3 include a composite grid circuit. A complete loop portion of this circuit extends from control grid 45, through the point marked A, thence through resistor 44 to the point marked B, thence through a portion of rheostat 24 to points C and D, thence through resistor 47 to points E and F and through the effective portion of the speed adjusting rheostat 41 to point G thus ending at the cathode of tube T3. It will be recognized that the plate circuits of tubes T4 and T5 are tied up with the just-mentioned portion of the grid circuit of tube T3. As will be explained later, however, the tubes T3 and T4 have no effect on the operation of the above-mentioned loop portion of the grid circuit as long as certain operating conditions are prevailing. Hence it appears to be logical and conducive to easier understanding if the function of tubes T4 and T5 is at first disregarded in the following discussion of the control operation performed by the above-mentioned grid circuit portion A—B—C—D—E—F—G of tube T3.

This circuit portion includes in series the three resistors or rheostats 24, 27 and 41. Each of these three resistors is impressed by a voltage that originates from outside voltage source and hence represent each a separate source of a component voltage for the grid circuit. The rheostat 41 develops along its effective portion a voltage drop (E1) which originates from the constant voltage source 40 and has a magnitude selected by the operator in accordance with the desired speed of feed motor FM. The resistor 47, as explained previously, develops across its terminals a voltage drop (E2) which varies in accordance with the rectifier terminal voltage impressed on motor FM. That portion of rheostat 24 which is series connected in the grid circuit imposes thereon a voltage component (E3) which represents an adjusted proportion of the voltage drop occurring across resistor 23. Since resistor 23 lies in series between the rectifier cathodes and the armature 7, its voltage drop and hence the component grid voltage across the effective portion of rheostat 24 is proportional to the IR drop in the armature circuit of motor FM.

The resultant grid voltage imposed on the control grid 45 of tube T3 is thus dependent upon the behavior of three components. One component (E1) remains constant as long as the speed setting of rheostat 41 remains undisturbed. The other two components (E2 and E3) tend to change during the operation of the system in accordance with the armature voltage and the IR drop, respectively. The polarities of the three component voltages are so chosen that the resultant voltage is the algebraic sum of the negative value of E1, the positive value of E2 and the negative value of E3. As a result, the condition of control grid 45 is basically determined by the setting of rheostat 41 and changes in proportion to the value of the motor voltage minus the IR drop occurring in the armature circuit during the operation of the motor. This resultant value is proportional to the motor speed.

By virtue of the above-described connection of tube T3 with the grid circuit of the rectifier tubes T1 and T2, the direct-current component of rectifier grid voltage varies also in accordance with the speed of motor FM. These variations have the effect of displacing the firing point of each rectifier with respect to the cycle of the alternating current to be rectified thus causing a corresponding change in the rectified output voltage and hence a change in the speed of motor FM. In this manner, a decrease in motor speed below the value set by rheostat 41 has the effect of producing a control action in the rectifier tubes T1 and T2 which is in proportion to the departure of the speed from the desired value and causes an increase in the rectified output voltage, thereby restoring the motor speed to the desired value. An increase in motor speed above the desired value has a similar effect except that it causes a decrease in rectified output voltage in order to reduce the motor speed to the intended value.

Referring now to the tubes T4 and T5, it will be seen that the plate circuits of these tubes contain a resistor 50 or 51 which is connected to the positive pole of the above-mentioned current source 40. Both tubes are pentodes having a sharp cut-off characterstic. The cathodes 52 and 53, respectively, of tubes T4 and T5 are interconnected and are also in connection to a point, marked H, of the armature circuit of motor FM. Consequently, the source 40 which provides the plate voltage for tube T3 serves also as a plate voltage source for tubes T4 and T5. The plate circuit of tube T4, for instance, extends from the appertaining anode through resistor 50, voltage source 40, points F and E, resistor 47, points D and C, resistor 23, and point H to the cathode of the tube. The plate circuits of tubes T4 and T5 are thus interlinked with the above-described grid circuit of tube T3. Consequently, the appearance of a voltage drop across either resistor 50 or 51 has the effect of imposing a bias on the grid voltage of tube T3 in superposition upon the above-mentioned resultant of the voltage components E1, E2 and E3. The occurrence and magnitude of such voltage drop across resistors 50 and 51 is controlled by the control grids 52 and 53, respectively, of tubes T4 and T5.

Grid 53 of tube T5 is connected through a resistor 54 to the slider of a rheostat 55 which is energized from a constant voltage source 56 in series connection with a current limiting resistor 57 and under control by the above-mentioned contacts 18, 19 and 20 of contactor CR. The positive pole of source 56 is connected to point D of the rectifier output circuit so that the grid circuit of tube T5 includes the load responsive measuring resistor 23 in the following manner. Starting at grid 53, the appertaining grid circuit extends through resistor 54, a portion of rheostat 55, the point marked I, points D and C, resistor 23, point H, and back to the cathode of tube T5. Consequently, the potential of grid 53 depends on two voltage components. One component is represented by the voltage drop between the slider of rheostat 55 and point I. The other voltage component is the voltage drop developed across resistor 23 in accordance with the rectified load current supplied to the armature 7 of motor FM. The component determined by the adjustment of the rheostat 55 is so chosen that the potential of grid 53 is normally highly negative and thus maintains the tube T5 normally in blocked condition. The voltage drop across resistor 23 acts in opposition to the adjusted bias. Hence when the load current of armature 7 increases beyond a value determined by the setting or rheostat 55, the grid 53 becomes sufficiently less negative to permit the passage of current through the plate circuit. Then the resistor 51 will develop a voltage drop which, as explained above, superimposes a control bias on the grid circuit of tube T3 with the result of causing the rectifier tubes T1 and T2 to reduce the voltage of their output current. In this manner, the speed of motor FM is reduced and the load correspondingly diminished. In summary, tube T5, in conjunction with the associated tube circuits, serves to prevent the feed motor from exceeding a maximum load of adjusted value by reducing under overload conditions the motor speed below the normal value selected at rheostat 41. When the overload conditions disappear, the correct feed motor speed as determined by rheostat 41 is automatically established. In order to prevent tube T5 from causing undesired transient phenomena during the starting and stopping periods of the machine tool drive, a capacitor 58 is connected with the current source 56 so that the displacement current flowing into the capacitor upon the closure of contactor CR delays the building up of the blocking potential across the rheostat 55. The capacitor 58 is discharged through contact 19 when the feed motor is stopped by depressing the pushbutton 22.

The control grid 52 of tube T4 is connected through a resistor 60 to the slider of a rheostat 61 which extends across a constant voltage source 62. The positive pole of source 62 is connected to a resistor 63 which, at point K, is in connection with the cathode of tube T4. Resistor 63 is connected across a rectifier 64. This rectifier is energized by a current transformer 65 which measures the load current of the cutter motor CM. Hence, the voltage drop developed across resistor 63 is a measure of the load imposed on the cutter 4 of the milling machine. The circuit of grid 52 extends through resistor 60 and the selected portion of rheostat 61, thence through the load measuring resistor 63 to point K and the cathode of tube T4. This grid circuit includes two sources of grid voltage. One source is represented by the adjusted portion of rheostat 61 and provides a grid bias which is highly negative so that tube T4 is normally prevented from conducting plate current. The second source of component grid voltage for tube T4 is formed by the load measuring resistor 63. The corresponding voltage component acts in opposition to the negative grid bias provided by rheostat 61. Consequently, when the load on the cutter 4 increases, thereby increasing the voltage drop across resistor 63, this will tend to make the control grid 52 of tube T4 less negative and in this way will cause the plate current through resistor 50 to increase. This in turn results in an increase of voltage drop across resistor 50, and the control grid 45 of tube T3 will become less negative. The plate current of tube T3 increases accordingly. Consequently, the firing angle of rectifier tubes T1 and T2 is delayed so that the rectified output voltage decreases and causes a slow down of the feed motor. Due to the high negative voltage bias imposed on grid 52 by rheostat 61, tube T4 does not conduct until the voltage drop across resistor 63 reaches a definite value set by the potentiometer 61. The operating point at which the control effect of tube T4 becomes operative under increasing cutter loads is, therefore, determined by the selected adjustment of potentiometer 61. Hence, by a proper selection of this adjustment, the operator can limit the cutter load in order to suit the cutter and workpiece for any particular working operation of the machine tool.

The potentiometer rheostat 61 can be calibrated in terms of cutter load current and a chart can be prepared to show the operating current for each cutter. The operator can then set the potentiometer 41 for the speed best suited for the cutter to enter the workpiece and then readjust it to the maximum permissible speed and let the cutter load regulate the speed as set on the potentiometer 61. This permits obtaining optimum production from the machine without fear of ruining the cutters.

As explained in the foregoing, the tubes T4 and T5 operate independently of each other. The speed regulation in dependence upon the cutter load is effected merely by tube T4 and the associated circuits so that tube T5 may be omitted if a speed control in dependence upon the feed motor load is unnecessary. The fact that the two tubes T4 and T5 operate in parallel and independently of each other shows also that instead of, or in addition to tube T5, one or several other tube arrangements may be used which are responsive to cutter loads in accordance with the operating principle of tube T4. Such use of a plurality of tubes arranged similar to that of tube T4 is of advantage for machines in which different types or sizes of cutters are to be used at the same time. The different tubes, all similar to tube T4, are allotted to the different respective cutters and their grid circuits are controlled in dependence upon the load current of the respective cutter motors. This permits the operator to adjust each potentiometer, according to potentiometer 61 of tube T4, to the proper load setting for its associated cutter motor or cutter. Then the feed motor will operate automatically at that speed which is proper for the cutter motor carrying the greatest proportional load. When a fragile cutter is cutting, this cutter will determine the maximum rate of feed, but if this cutter does not happen to be cutting, some more rugged cutter or one of the cutter motors carrying the largest percentage of its rated load will determine the rate of feed. Thus, the machine will always be caused to operate at the highest rate of feed suitable for the conditions under which the machine is operating at any moment. In this manner the feed can be maintained at that rate which will not overload any of the motors and will not put too heavy a duty upon any of the cutters. In case the rate of feed is lower than that proper for the work being done by the cutter or the motor least able to withstand the load, the feed rate will be increased automatically until the optimum load for that cutter or motor is reached.

It will be understood by those skilled in the art that other modifications or alterations are possible in systems according to the invention as described in the foregoing without departing from the gist of the invention or from the essential features of the invention as set forth in the claim attached hereto.

I claim as my invention:

1. A machine tool control system, comprising a tool operating motor, a direct-current feed motor, alternating current supply means for said feed motor, electronic rectifier means of the gaseous discharge type connected to said supply means for energizing said feed motor by rectified current derived from said supply means, said rectifier means having a control circuit for varying the voltage of said rectified current and thereby the speed of said feed motor, an electronic vacuum tube having a plate circuit connected with said control circuit and a grid circuit for controlling said plate circuit, adjustable circuit means connected with said grid circuit for imposing thereon a voltage adjusted in accordance with a selected value of motor speed, and electric circuit means disposed for measuring the load of said tool operating motor and connected to said grid circuit for superimposing another voltage thereon so as to vary said rectified voltage in dependence upon said load current, said circuit means comprising an electronic tube having a plate circuit connected with said control circuit and having a grid circuit equipped with adjustable potentiometer means for providing a cut-off bias of selective magnitude and with a circuit member for providing oppositely acting bias variable in accordance with the load current of the cutter motor in order to cause a reduction in voltage of said rectified current when said load current exceeds a value determined by the selected adjustment of said potentiometer means.

2. A machine tool control system, comprising a cutter motor and a direct-current feed motor, alternating current supply means for said feed motor, electronic rectifier means of the gaseous discharge type connected to said supply means for energizing said feed motor by rectified current derived from said supply means, said rectifier means having a control circuit for varying the voltage of said rectified current and thereby the speed of said feed motor, an electronic vacuum tube having a plate circuit connected with said control circuit and a grid circuit for controlling said plate circuit, an adjustable potentiometer disposed in said grid circuit for imposing thereon a component voltage in accordance with a speed value for said feed motor determined by the selected adjustment of said potentiometer, circuit means also disposed in said grid circuit for imposing thereon a voltage variation in accordance with the speed of said feed motor so as to maintain said speed normally at said selected value, and load-responsive circuit means connected with said grid circuit for superimposing thereon another voltage variation in dependence upon the load current of the cutter motor so as to reduce the speed of the feed motor below said selected value when said load current exceeds a given magnitude.

3. A machine tool control system comprising a tool operating motor and a direct-current feed motor, alternating current supply means for said feed motor, electronic rectifier means of the gaseous discharge type connected to said supply means for energizing said feed motor by rectified current derived from said supply means, said rectifier means having a control circuit for varying the voltage of said rectified current and thereby the speed of said feed motor, an electronic vacuum tube having a plate circuit connected with said control circuit and a grid circuit for controlling said plate circuit, an adjustable potentiometer disposed in said grid circuit for imposing thereon a component voltage in accordance with a speed value for said feed motor determined by the selected adjustment of said potentiometer, circuit means also disposed in said grid circuit for imposing thereon a voltage variation in accordance with the speed of said feed motor so as to maintain said speed normally at said selected value, and load-responsive circuit means connected with said grid circuit for superimposing thereon another voltage variation in dependence upon the load current of said tool operating motor, said load-responsive circuit means comprising an electronic tube having a plate circuit connected with said control circuit and having a grid circuit equipped with adjustable potentiometer means for providing a cut-off bias of selective magnitude and with a circuit member for providing oppositely acting bias variable in accordance with said load current, whereby the speed of the feed motor is reduced below said selected value when said load current exceeds a magnitude determined by the selected adjustment of said potentiometer means.

4. A machine control system, comprising a direct current drive motor, circuit means for supplying alternating current, electronic rectifier means of the gaseous discharge type disposed between said circuit means and said motor for energizing said motor by rectified current, said rectifier means having a control circuit for varying the voltage of said rectified current and thereby the speed of said motor, circuit means connected to said control circuit for causing it to vary said rectified voltage in dependence upon load magnitudes, said circuit means comprising a plurality of electronic tubes all having their respective plate circuits connected to said control circuit and each having a grid circuit equipped with adjustable potentiometer means for providing a blocking bias of selective magnitude and with a load-responsive circuit member for providing a variable bias in opposition to said blocking bias, whereby the speed of said motor is reduced when the load acting upon any one of said circuit members exceeds a magnitude determined by the selected adjustment of said respective potentiometer means.

5. A machine control system, comprising an operating motor and a direct-current feed motor, alternating current supply means for said feed motor, electronic rectifier means of the gaseous discharge type connected to said supply means for energizing said feed motor by rectified current derived from said supply means, said rectifier means having a control circuit for varying the voltage of said rectified current and thereby the speed of said feed motor, an electronic vacuum tube having a plate circuit connected with said control circuit and a grid circuit for controlling said plate circuit, an adjustable potentiometer disposed in said grid circuit for imposing thereon a component voltage in accordance with a speed value for said feed motor determined by the selected adjustment of said potentiometer, circuit means also disposed in said grid circuit for imposing thereon a voltage variation in accordance with the speed of said feed motor so as to maintain said speed normally at said selected value, and load-responsive circuit means connected with said grid circuit for superimposing thereon another voltage variation in dependence upon load conditions of said operating motor, said load-responsive circuit means comprising a plurality of electronic tubes all having their respective plate circuits connected to said control circuit and each having a grid circuit equipped with adjustable potentiometer means for providing a blocking bias of selective magnitude and with a load-responsive circuit member for providing a variable bias in opposition to said blocking bias, whereby the speed of said drive motor is reduced when the load acting upon any one of said circuit members exceeds a magnitude determined by the selected adjustment of said respective potentiometer means.

GEORGE E. KING.